(12) United States Patent
Bajaj et al.

(10) Patent No.: US 11,169,887 B2
(45) Date of Patent: Nov. 9, 2021

(54) PERFORMING A DATABASE BACKUP BASED ON AUTOMATICALLY DISCOVERED PROPERTIES

(71) Applicant: Cohesity, Inc., San Jose, CA (US)

(72) Inventors: Rupesh Bajaj, Dewas (IN); Vivek Velankar, Bangalore (IN); Sandeep Tandekar, Bangalore (IN); Sunil Moolchandani, Santa Clara, CA (US); Apollo Aguilan Tanting, Millbrae, CA (US); Aditya Tandon, San Francisco, CA (US)

(73) Assignee: Cohesity, Inc., San Jose, CA (US)

( * ) Notice: Subject to any disclaimer, the term of this patent is extended or adjusted under 35 U.S.C. 154(b) by 232 days.

(21) Appl. No.: 16/280,696

(22) Filed: Feb. 20, 2019

(65) Prior Publication Data

US 2020/0264957 A1 Aug. 20, 2020

(51) Int. Cl.
*G06F 11/14* (2006.01)
(52) U.S. Cl.
CPC ...... *G06F 11/1451* (2013.01); *G06F 2201/80* (2013.01)
(58) Field of Classification Search
CPC .......................... G06F 11/1451; G06F 2201/80

USPC ........................................................ 707/645
See application file for complete search history.

(56) References Cited

U.S. PATENT DOCUMENTS

| | | | |
|---|---|---|---|
| 9,934,107 B1* | 4/2018 | Chikkanayakanahally | ................. G06F 11/1456 |
| 10,387,262 B1* | 8/2019 | Chikkanayakanahally | ................. G06F 11/1461 |
| 10,606,709 B1* | 3/2020 | Bansal | ................... G06F 9/5072 |
| 2007/0180314 A1* | 8/2007 | Kawashima | ........ G06F 11/3433 714/15 |
| 2016/0248658 A1* | 8/2016 | Patel | ...................... H04L 45/127 |
| 2018/0157560 A1* | 6/2018 | Gochkov | ............ G06F 11/2048 |

* cited by examiner

*Primary Examiner* — Joshua Bullock
(74) *Attorney, Agent, or Firm* — Van Pelt, Yi & James LLP

(57) ABSTRACT

Properties of one or more databases of nodes of a database system are automatically discovered. The automatically discovered properties for at least one of the databases include a database architecture and a corresponding failover role for each of at least some of the nodes. Based at least in part on the discovered properties, a corresponding one of the nodes as a corresponding backup source node is selected for each of the one or more databases. One or more database backups are allowed to be performed via the one or more selected backup source nodes.

20 Claims, 6 Drawing Sheets

250 ⇁

| Database Configuration | DB Node 208 |
|---|---|
| Stand Alone | sa11db_A |
| Stand Alone | sa12db_A |

| Database Configuration | DB Node 209 | DB Node 210 | DB Node 211 |
|---|---|---|---|
| Stand Alone | Primary_DB1 | Standby_DB2 | Standby_DB3 |

FIG. 2D

PERFORMING A DATABASE BACKUP BASED ON AUTOMATICALLY DISCOVERED PROPERTIES

BACKGROUND OF THE INVENTION

A primary system may be comprised of a plurality of database nodes running a plurality of databases. The databases may be backed up to a secondary storage system. A backup may be a full backup snapshot or an incremental backup snapshot of the database. A full backup snapshot includes all the data associated with a database. An incremental backup snapshot includes the data associated with a database that was not previously backed up.

BRIEF DESCRIPTION OF THE DRAWINGS

Various embodiments of the invention are disclosed in the following detailed description and the accompanying drawings.

FIG. 2C is a diagram illustrating an embodiment of a data structure storing database configuration information associated with a primary system.

FIG. 2D is a diagram illustrating an embodiment of a data structure storing database configuration information associated with a primary system.

DETAILED DESCRIPTION

Figure 1:
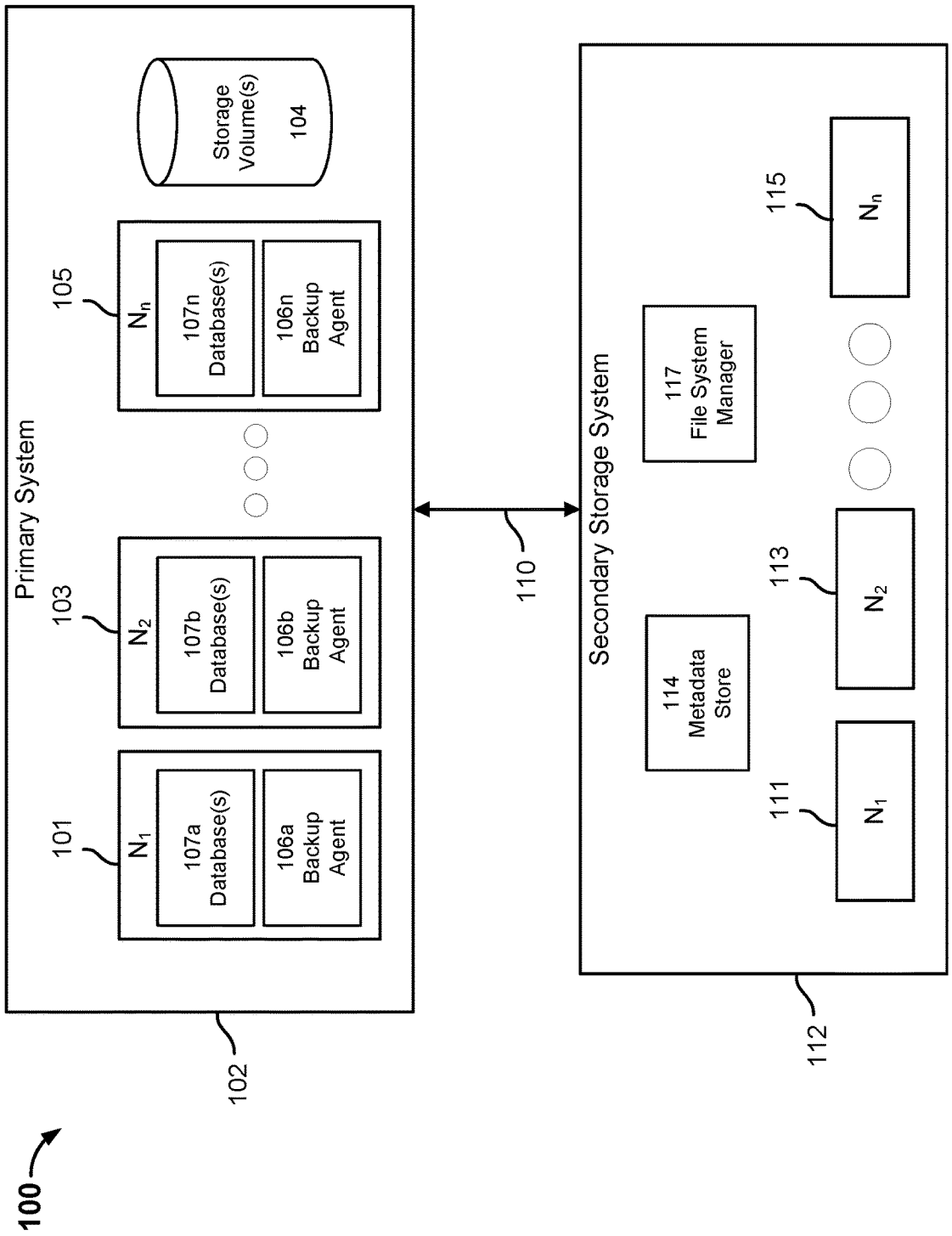
FIG. 1 is a block diagram illustrating an embodiment of a system for backing up a database.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A primary system may be comprised of one or more database nodes. A database node may be running one or more databases. A database may have a particular architecture. For example, the database may be a stand-alone database (single or multiple) or a database cluster. A single stand-alone database is comprised of a single instance of a database that is hosted on a database node. A multiple stand-alone database may be comprised of a database service where the database service is active on one of the database nodes and passive on the other database nodes. A database node that hosts an active database service may be configured to run the database service. A database node that hosts a passive database service is not accessible, but acts as a failover in the event the active database service goes offline. In other embodiments, a multiple stand-alone database is comprised of multiple instances of a stand-alone database where one instance of the stand-alone database has a primary role on one of the database nodes and one or more other instances of the stand-alone database have a standby role on one or more other database nodes. A stand-alone database that has a standby role is a database that is used as a failover in the event the stand-alone database that has an active role goes offline. A database cluster may be comprised of a plurality of database instances where each database instance is in an active role.

A database and its associated data may be backed up to a secondary storage system. However, the one or more commands to cause a database node to perform a backup snapshot may depend on the architecture associated with the database. For example, the one or more commands to cause a database node to perform a backup snapshot of a stand-alone database may be different than the one or more commands to cause a database node to perform a backup snapshot of a database instance that is part of a database cluster. Using an incorrect set of one or more backup commands may prevent or delay a database node from performing a backup snapshot.

For a single stand-alone database hosted on a database node, the database node hosting the single stand-alone database may be used to perform a backup snapshot. For a multiple stand-alone database architecture, the database node that is to be used to perform the backup snapshot may depend on a failover role associated with the stand-alone database hosted on the database node. For example, a database node that hosts an active database service may be used to perform a backup snapshot instead of a database node that hosts a passive database service. The active database service is used instead of the passive database service because the passive database service is not accessible. A stand-alone database that has a standby role may be used to perform a backup snapshot instead of a stand-alone database that has a primary role to free up resources of the database node hosting the stand-alone database that has the primary role and preserve the resources available to the stand-alone database that has the primary role for one or more other purposes, such as to fulfill one or more database requests. For a database cluster that is comprised of a plurality of database nodes hosting corresponding active instances of the database, any of the database nodes may be used to perform a backup snapshot. In some embodiments, a database cluster is comprised of a primary database instance and one or more standby database instances. A database node hosting a standby database instance may be used to perform a backup snapshot.

Configuring a primary system to perform backups is a tedious and time consuming process. The primary system may be running one or more databases at the same time. Identifying an architecture of the database to be backed up is critical to ensuring that a correct set of one or more backup commands are used to back up the database. Using an incorrect set of one or more backup commands may prevent or delay the database from being backed up.

For a multiple stand-alone database architecture, identifying which database node to use to perform a backup is also critical because using an incorrect database node to perform a backup snapshot may degrade one or more performance metrics associated with the database. Manually configuring the primary system to perform backups is subject to human error, which may result in databases not being backed up because a wrong set of commands are provided to a database node or a degradation in database performance because an incorrect or sub-optimal database node is used to perform a backup.

The process of configuring a primary system to perform one or more database backups may be automated through the use of one or more backup agents. A user associated with a primary system may provide registration information and register one or more database nodes with a secondary storage system. The registration information may include an identifier associated with a database. For example, the registration information may include a Single Client Access Name (SCAN) name associated with a database cluster, a virtual internet protocol (VIP) address associated with one or more nodes included in a database, an IP address associated with each database node of the database, and/or any other identifying information associated with a database node. The secondary storage system may use the registration information to send to a registered database node a request to install a backup agent.

In some embodiments, the user associated with a primary system registers all of the database nodes associated with a database. The secondary storage system may send a request to install a corresponding backup agent to the registered database nodes.

In other embodiments, the user associated with a primary system registers one of the database nodes associated with a database. For example, the user may provide a SCAN name or a VIP address associated with a database. The secondary storage system may send a request to install a backup agent to the database node associated with the SCAN name or VIP address. The backup agent may be installed on the database node associated with the SCAN name or the database node associated with the VIP address. The backup agent may send a processor of the database node on which the backup agent is installed a request for a list of the one or more other database nodes associated with the SCAN name or the VIP address. In response to the request, the processor of the database node on which the backup agent is installed may provide an identifier (e.g., IP address) associated with the one or more other database nodes associated with the SCAN name or VIP address. The secondary storage system may send a request to install a corresponding backup agent to each of the other database nodes associated with the SCAN name or VIP address, and the corresponding backup agents may be installed on the one or more other database nodes associated with the SCAN name or VIP address.

In addition to database associated with the SCAN name or VIP address, a database node may be running one or more other databases. A backup agent may discover the one or more other databases running on the database node on which the backup agent is installed. In some embodiments, the backup agent sends to a processor of the database node on which the backup agent is installed a request for a list of the one or more databases running on the database node. The list of one or more databases may include one or more stand-alone databases and/or one or more database nodes that are part of one or more database clusters. The list may also include corresponding role information associated with the one or more databases running on a database node.

The one or more installed backup agents may provide to the secondary storage system the corresponding lists and corresponding role information associated with the one or more databases running on the corresponding database nodes. In response to receiving the information, the secondary storage system may compile the lists and information, and determine an overall configuration of the primary system. For example, the secondary storage system may determine that a database running on a database node is a stand-alone database and another database running on the database node is a database instance that is part of a database cluster. The secondary storage system may store a data structure that organizes the configuration information of the primary system.

The one or more databases running on the primary system may be backed up according to a backup snapshot policy. The backup snapshot policy may indicate when one of the one or more databases is to be backed up. The secondary storage system may inspect the data structure to determine which database node hosting a database is to be used to perform the backup snapshot. The secondary storage system may send to the backup agent installed on the determined node a command to backup the database. In response to receiving the command, the backup agent may cause the database node on which the backup agent is installed to perform a backup snapshot. This ensures that a correct database node of the primary system is used to perform a backup snapshot without hindering database performance.

The role associated with a database node may change without warning. For example, for a multiple stand-alone database, a database node hosting an active database service may go offline, which may cause a passive database service to become active and act as a failover. It may be difficult to keep track of all of the role changes associated with the databases. The secondary storage system may receive from a backup agent updated database role information. In some embodiments, the secondary storage system periodically receives from the backup agent updated database role information. In other embodiments, the secondary storage system receives from the backup agent updated database role information when a role of the database changes. In response to receiving the updated database role information, the secondary storage system may update the data structure that organizes the configuration information of the primary system. This ensures that the secondary storage system sends a backup command to the correct database node of the primary system.

FIG. 1 is a block diagram illustrating an embodiment of a system for backing up a database. In the example shown, system 100 includes primary system 102 and secondary storage system 112.

Primary system 102 is comprised of a plurality of database nodes. In the example shown, primary system 102 includes three database nodes 101, 103, 105, but may include n database nodes. A database node may be a computer, a server, a computing device, or any other device capable of hosting a database. In some embodiments, the plurality of database nodes are located at a same physical location. In other embodiments, the plurality of database nodes are located at different locations.

A database node may host one or more databases. Each database node 101, 103, 105 hosts one or more databases 107a, 107b, 107n, respectively. A database may have a particular architecture. For example, the database may be a stand-alone database (single or multiple) or a database cluster. One of the one or more databases 107a, 107b, 107n may host a single stand-alone database, a stand-alone database that is part of a multiple stand-alone database, or a database instance that is part of a database cluster.

A single stand-alone database is comprised of a single instance of a database that is hosted on a database node. For example, the single stand-alone database may be hosted on either of database nodes 101, 103, 105.

A multiple stand-alone database may be comprised of a database service where the database service is active on one of the database nodes and passive on the other database nodes. A database node that hosts an active database service may be configured to run the database service. A database node that hosts a passive database service is not accessible, but acts as a failover in the event the active database service goes offline. For example, database node 101 may host an active database service and database nodes 103, 105 may host corresponding passive database services. Database nodes 101, 103, 105 may be configured to share storage volume 104 in the event the database nodes are hosting a database service.

In other embodiments, a multiple stand-alone database is comprised of multiple instances of a stand-alone database where one instance of the stand-alone database has a primary role on one of the database nodes and one or more other instances of the stand-alone database have a standby role on one or more other database nodes. A stand-alone database that has a standby role is a database that is used as a failover in the event the stand-alone database that has an active role goes offline. For example, database node 101 may host a stand-alone database that has a primary role, database node 103 may host a stand-alone database that has a standby role, and database node 105 may host a stand-alone database that has a standby role. Database nodes 101, 103, 103 may each have their own corresponding storage volume 104 in the event the database nodes are hosting a stand-alone database that has either a primary role or standby role.

A database cluster is comprised of a plurality of database nodes hosting different instances of the same database. Each database node may be running an active database instance. For example, database node 101 may host a first active instance of a first database, a database node 103 may host a second active instance of the first database, . . . , and database node 105 may host an nth active instance of the first database. In some embodiments, a database cluster is comprised of a primary database instance and one or more standby database instances. A database node hosting a standby database instance may be used to perform a backup snapshot.

A database node may host a plurality of databases having different roles. For example, database node 101 may host an instance of a first database that is part of a database cluster and a stand-alone database. Database node 103 may host an active database service associated with a first database and a passive database service associated with a second database. Database node 105 may host a stand-alone database that has a standby role for a first database and a stand-alone database that has a passive role for a second database.

Database content associated with a database may be stored in one or more storage volumes 104. The database content may include one or more database files, such as a primary database file, a log file, a tablespace, a schema, a datafile, a control file, etc. In some embodiments, each database node 101, 103, 105 has its own corresponding storage volume. In other embodiments, one or more storage volumes 104 is a storage volume shared by a plurality of database nodes.

Each database node 101, 103, 105 may have its own corresponding backup agent 106a, 106b, 106n, respectively. A backup agent may receive from secondary storage system 112 a command to perform a backup snapshot. The command to perform a backup snapshot may be with respect to one or more databases hosted by the database node on which the backup agent is installed. The backup agents 106a, 106b, 106n may cause their corresponding database nodes 101, 103, 105 to perform a backup snapshot according to a backup snapshot policy. A backup snapshot policy may indicate when a full backup snapshot or an incremental backup snapshot is to be performed. A full backup snapshot may include all of the data associated with a database. An incremental backup snapshot may include the data associated with a database that has not been previously backed up. The backup snapshot policy may indicate when one of the one or more databases is to be backed up. For example, the backup snapshot policy may indicate that a database is to be periodically backed up (e.g., hourly, daily, weekly, etc.). The backup snapshot policy may indicate that a database is to be backed up after a threshold amount of data associated with the database has changed. The backup snapshot policy may indicate that a database is to be backed up in response to a command from a user associated with the database.

Secondary storage system 112 may cause backup agents 106a, 106b, 106n to be installed on corresponding database nodes 101, 103, 105. In some embodiments, a user associated with primary system 102 registers at secondary storage system 112 all of the database nodes associated with a database. For example, the database nodes may be part of a multiple stand-alone database that is comprised of multiple instances of a stand-alone database where one instance of the stand-alone database has a primary role on one of the database nodes and one or more other instances of the stand-alone database have a standby role on one or more other database nodes. The user may provide IP addresses associated with each of the database nodes. The secondary storage system may send a request to install a corresponding backup agent to the database nodes associated with the IP addresses.

In other embodiments, a user associated with primary system 102 may register with secondary storage system 112 one of the database nodes 101, 103, 105. The user associated with primary system 102 may provide to secondary storage system 112 registration information for one of the database nodes 101, 103, 105. The registration information may include information associated with at least one of the database nodes of which the user associated with primary system 102 wants secondary storage system 112 to backup. For example, the registration information may include a SCAN name associated with a database cluster, a VIP address associated with one of the database nodes, and/or any other identifying information associated with a database node.

Secondary storage system 112 may use the registration information to send to at least one of the database nodes 101, 103, 105 a request to install a corresponding backup agent. For example, database node 101 may be associated with a SCAN name and secondary storage system 112 may send the request to database node 101 and backup agent 106a may be installed on database node 101. Backup agent 106a may send to a processor of database node 101 a first request for a list of the one or more other database nodes associated with the SCAN name or VIP address (e.g., database nodes 103, 105). In response to the request, the processor of database node 101 may provide an identifier (e.g., IP address) associated with the one or more other database nodes associated with the SCAN name or VIP address (e.g., database nodes 103, 105). Secondary storage system 112 may send a request to install a corresponding backup agent to each of the other database nodes associated with the SCAN name or VIP address and the corresponding backup agents (e.g., backup agents 106b, 106n) may be installed on the one or more other database nodes associated with the SCAN name or VIP address.

In addition to an instance of a database associated with the SCAN name or VIP address, a database node may be running one or more other databases. For example, database node 101 may be running one or more databases 107a. Backup agent 106a may discover the one or more databases 107a running on database node 101. In some embodiments, backup agent 106a sends to a processor of database node 101 a request for a list of the one or more databases 107a running on database node 101. The list of one or more databases may include one or more stand-alone databases and/or one or more database instances that are part of one or more database clusters. The list may also include corresponding role information associated with the one or more databases running on a database node. Backup agents 106b, 106n may similarly discover one or more databases running on database nodes 103, 105, respectively.

Backup agents 106a, 106b, 106n may provide to secondary storage system 112 the corresponding lists and corresponding role information associated with the one or more databases 107a, 107b, 107n running on database nodes 101, 103, 105. In response to receiving the information, secondary storage system 112 may compile the lists and role information, and determine an overall configuration of primary system 102. Secondary storage system 112 may store a data structure that organizes the configuration information of primary system 102. The one or more databases 107a, 107b, 107n running on primary system 102 may be backed up according to a backup snapshot policy. The backup policy may indicate when one of the one or more databases 107a, 107b, 107n is to be backed up. Secondary storage system 112 may inspect the data structure to determine database node of primary system 102 is to be used to perform the backup snapshot. Secondary storage system 112 may send to the backup agent installed on the determined node a command to backup a database. For example, secondary storage system 112 may send to backup agent 106a a command to backup one of the databases 107a. In response to receiving the command, the backup agent may cause the database node on which the backup agent is installed to perform a backup snapshot. For example, backup agent 106a may cause database node 101 to perform a backup snapshot. This ensures that a correct database node of primary system 102 is used to perform a backup snapshot without hindering database performance.

Secondary storage system 112 may receive from at least one of the backup agent 106a, 106b, 106n updated database role information. In some embodiments, secondary storage system 112 periodically receives from at least one of the backup agent 106a, 106b, 106n updated database role information. In other embodiments, secondary storage system 112 receives from at least one of the backup agent 106a, 106b, 106n updated database role information when a role of the database changes. In response to receiving the updated database role information, secondary storage system 112 may update the data structure that organizes the configuration information of primary system 102. This ensures that secondary storage system 112 sends a backup command to the correct database node of the primary system 102. A performance associated with a database may be reduced in the event an incorrect database node hosting an instance of the database is used to perform a backup.

Secondary storage system 112 is a storage system configured to ingest and store file system data received from primary system 102 via connection 110. The file system data may include data associated with one of the databases running on a database node. Secondary storage system 112 may be comprised of one or more storage nodes 111, 113, 115. Each storage node may have its own corresponding processor. The one or more storage nodes may be one or more solid state drives, one or more hard disk drives, or a combination thereof. The file system included in a backup snapshot may be stored in one or more of the storage nodes 111, 113, 115. The file system data may be received from one of the database nodes 101, 103, 105. In one embodiment, secondary storage system 112 is comprised of one solid state drive and three hard disk drives.

Secondary storage system 112 may include file system manager 117. File system manager 117 is configured to organize in a tree data structure the file system data received in a backup snapshot from primary system 102. An example of the tree data structure is a snapshot tree (e.g., Cohesity Snaptree), which may be based on a B+ tree structure (or other type of tree structure in other embodiments). The tree data structure provides a view of the file system data corresponding to a backup snapshot. The view of the file system data corresponding to the backup snapshot may be comprised of a file system metadata snapshot tree and a plurality of file metadata trees. A file metadata tree may correspond to one of the files included in the backup snapshot. The file metadata tree is a snapshot structure that stores the metadata associated with the file. For example, a file metadata tree may correspond to one of the database files associated with a database. A database file associated with a database may include a primary database file, a log file, a tablespace, a schema, a datafile, a control file, etc.

File system manager 117 may be configured to perform one or more modifications to a file system metadata snapshot tree and a file metadata tree. The file system metadata snapshot tree and file metadata trees may be stored in metadata store 114. The metadata store 114 may store the view of file system data corresponding to a backup snapshot. The metadata store may also store data associated with database files that are smaller than a limit size.

The tree data structure may be used to capture different versions of backup snapshots. The tree data structure allows a chain of snapshot trees corresponding to different versions of backup snapshots (i.e., different file system metadata snapshot tree versions) to be linked together by allowing a node of a later version of a file system metadata snapshot tree to reference a node of a previous version of a file system metadata snapshot tree (e.g., a "snapshot tree forest"). For example, a root node or an intermediate node of a second file system metadata snapshot tree corresponding to a second backup snapshot may reference an intermediate node or leaf node of a first file system metadata snapshot tree corresponding to a first backup snapshot.

A file system metadata snapshot tree includes a root node, one or more levels of one or more intermediate nodes associated with the root node, and one or more leaf nodes associated with an intermediate node of the lowest intermediate level. The root node of a file system metadata snapshot tree includes one or more pointers to one or more intermediate nodes. Each intermediate node includes one or more pointers to other nodes (e.g., a lower intermediate node or a leaf node). A leaf node may store file system metadata, data associated with a file that is less than a limit size, an identifier of a data brick, a pointer to a file metadata tree (e.g., Blob structure), or a pointer to a data chunk stored on the secondary storage system.

Data associated with a file that is smaller than or equal to a limit size (e.g., 256 kB) may be stored in a leaf node of the file system metadata snapshot tree. A leaf node may be an index node (inode). A file metadata tree may be generated for a file that is larger than the limit size. The file metadata tree is a snapshot structure and is configured to store the metadata associated with a version of a file. The file may correspond to a database file associated with one of the databases.

The file metadata tree includes a root node, one or more levels of one or more intermediate nodes associated with the root node, and one or more leaf nodes associated with an intermediate node of the lowest intermediate level. The tree data structure associated with a file metadata tree allows a chain of file metadata trees corresponding to different versions of a file to be linked together by allowing a node of a later version of a file metadata tree to reference a node of a previous version of a file metadata tree. For example, a root node or an intermediate node of a second file metadata tree corresponding to a second version of a database file may reference an intermediate node or leaf node of a first file metadata tree corresponding to a first version of the database file.

A leaf node of a file metadata tree includes an identifier of a data brick associated with one or more data chunks of the file or a pointer to the data brick associated with one or more data chunks of the file. For example, a file metadata tree may correspond to a database file and a leaf node of the file metadata tree may include a pointer to or an identifier of a data brick associated with one or more data chunks of the database file. A data brick may include one or more data chunks. In some embodiments, the size of a brick is 256 kB. The data brick may include one or more data chunks. The one or more data chunks may be of variable length within a particular range (e.g., 4 kB to 64 kB).

The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 2A:
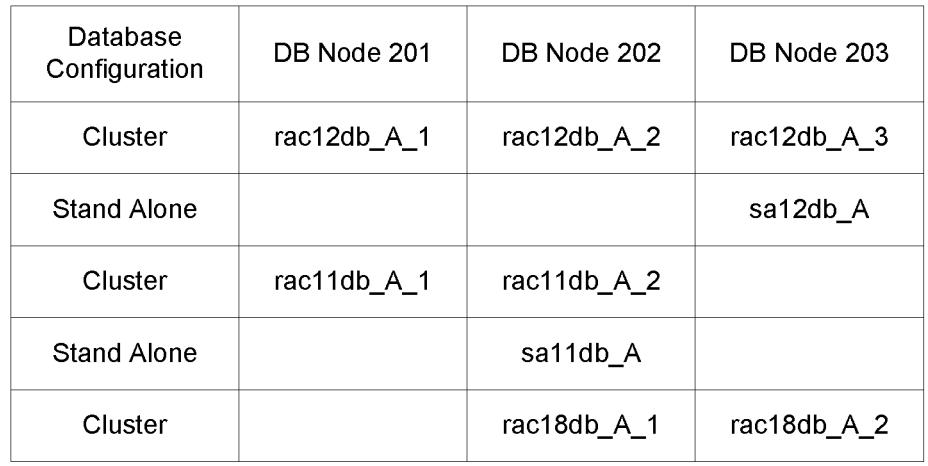
FIG. 2A is a diagram illustrating an embodiment of a data structure storing database configuration information associated with a primary system.

FIG. 2A is a diagram illustrating an embodiment of a data structure storing database configuration information associated with a primary system. In the example shown, data structure 200 illustrates the databases running on each of the database nodes 201, 202, 203. Data structure 200 may be stored by a storage system, such as secondary storage system 112.

In the example shown, database node 201 is hosting a first instance of a database named "rac12" and a first instance of a database named "rac11." Both databases "rac12" and "rac12" have an active role.

In the example shown, database node 202 is hosting a second instance of the database named "rac12," a second instance of the database named "rac11," a stand-alone database named "sa11," and a first instance of a database named "rac18." The second instance of the database named "rac12" has an active role, the second instance of the database named "rac11" has an active role, the stand-alone database named "sa11" has an active role, and the first instance of the database named "rac18" has an active role.

In the example shown, database node 203 is running a third instance of the database named "rac12," a stand-alone database named "sa12," and a second instance of a database named "rac18." The third instance of the database named "rac12" has an active role, the stand-alone database named "sa12" has an active role, and the second instance of the database named "rac18" has an active role.

In other embodiments, a database cluster may be comprised of a primary database instance and one or more standby database instances. A database node hosting a standby database instance may be used to perform a backup snapshot.

A database and its associated data may be backed up to a secondary storage system. However, the one or more commands to cause a database node to perform a backup snapshot may depend on the database architecture. The one or more commands to perform a backup snapshot of a stand-alone database may be different than the one or more commands to perform a backup snapshot of a database instance that is part of a database cluster. For example, the one or more commands to cause database node 202 to perform a backup of database "rac12" may be different than the one or more commands to cause database node 202 to perform a backup of database "sa11." Using an incorrect set of one or more backup commands may prevent a database node from performing a backup snapshot of the database that is to be backed up. For example, database node 202 may receive from a secondary storage system a set of one or more backup commands associated with performing a backup of the data associated with database "sa11," but the set of one or more backup commands are for a database cluster. This may prevent database node 202 from performing a backup snapshot of database "sa11."

Figure 2B:
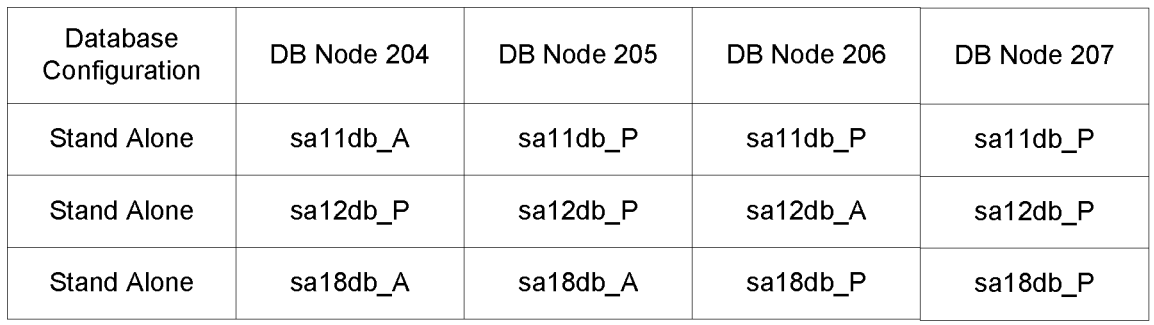
FIG. 2B is a diagram illustrating an embodiment of a data structure storing database configuration information associated with a primary system.

FIG. 2B is a diagram illustrating an embodiment of a data structure storing database configuration information associated with a primary system. In the example shown, data structure 225 illustrates the databases running on each of the database nodes 204, 205, 206, 207. Data structure 225 may be stored by a storage system, such as secondary storage system 112.

In the example shown, database nodes 204, 205, 206, 207 are part of a plurality of a multiple stand-alone databases. Database node 204 is hosting an active database service named "sa11," a passive database service named "sa12," and an active database service named "sa18." Database node 205 is hosting a passive database service named "sa11," a passive database service named "sa12," and an active database service named "sa18." Database node 206 is hosting a passive database service named "sa11," an active database service named "sa12," and a passive database service named "sa18." Database node 207 is hosting a passive database service named "sa11," a passive database service named "sa12," and a passive database service named "sa18."

For a multiple stand-alone database architecture, identifying which database node to use to perform a backup is also critical because using an incorrect database node to perform a backup snapshot may degrade one or more performance metrics associated with the database. A database node that hosts an active database service may be used to perform a backup snapshot instead of a database node that hosts a passive database service. The active database service is used instead of the passive database service because the passive database service is not accessible. In the example shown, database node 204 may be used to perform a backup of database service "sa11," database node 206 may be used to perform a backup of database service "sa12," and either database node 204 or database node 205 may be used to perform a backup of database service "sa18."

FIG. 2C is a diagram illustrating an embodiment of a data structure storing database configuration information associated with a primary system. In the example shown, data structure 250 illustrates the databases running on database node 208. Data structure 250 may be stored by a storage system, such as secondary storage system 112.

In the example shown, database node 208 is hosting a stand-alone database named "sa11" and a stand-alone database named "sa12." Both stand-alone database have an active state. In the event either stand-alone databases are to be backed up, database node 208 is to be used to perform the backup.

FIG. 2D is a diagram illustrating an embodiment of a data structure storing database configuration information associated with a primary system. In the example shown, data structure 275 illustrates the databases running on each of the database nodes 209, 210, 211. Data structure 275 may be stored by a storage system, such as secondary storage system 112.

In the example shown, database nodes 209, 210, 211 are part of a multiple stand-alone database. Database node 209 is hosting a stand-alone database that has a primary role, database node 210 is hosting a stand-alone database that has a standby role, and database node 211 is hosting a stand-alone database that has a standby role. In other embodiments, database nodes 209, 210, 211 are part of a database cluster where database node 209 is hosting a database instance with a primary role, database node 210 is hosting a database instance with a standby role, and database node 211 is hosting a database instance with a standby role.

For a multiple stand-alone database architecture, identifying which database node to use to perform a backup is also critical because using an incorrect database node to perform a backup snapshot may degrade one or more performance metrics associated with the database. A stand-alone database that has a standby role may be used to perform a backup snapshot instead of a stand-alone database that has a primary role to free up resources of the database node hosting the stand-alone database that has the primary role and preserve the resources available to the database node hosting the stand-alone database that has the primary role for one or more other purposes, such as to fulfill one or more database requests. In the example shown, either database node 210 or database node 211 may be used to perform a backup of the multiple stand-alone database.

Figure 3:
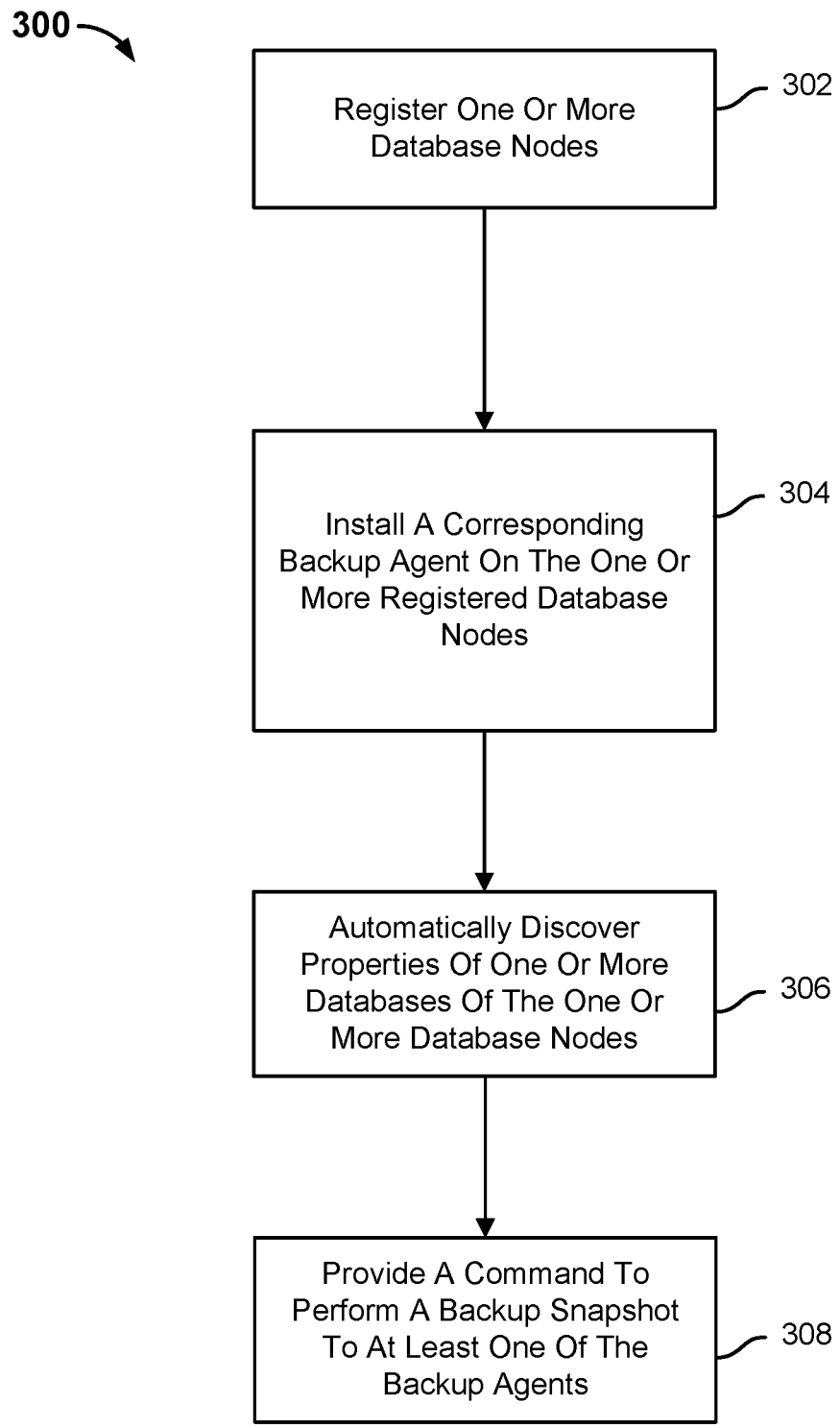
FIG. 3 is a flow chart illustrating an embodiment of a process for backing up a database.

FIG. 3 is a flow chart illustrating an embodiment of a process for backing up a database. In the example shown, process 300 may be implemented by a storage system, such as secondary storage system 112.

At 302, one or more database nodes are registered. A primary system (e.g., database system) may be comprised of one or more database nodes and a user associated with the primary system may register the one or more database nodes with a secondary storage system. The user associated with the primary system may provide registration information. In some embodiments, the user associated with the primary system registers one database node of a plurality of database nodes associated with a primary system. In other embodiments, the user associated with the primary system registers all of the database nodes associated with a primary system.

The registration information may include an identifier associated with a database. For example, the registration information may include a SCAN name associated with a database cluster, a VIP address associated with one or more nodes included in a database, an IP address associated with a stand-alone database node, and/or any other identifying information associated with a database node.

At 304, a corresponding backup agent is installed on the one or more registered database nodes. The secondary storage system may use the registration information to send to a registered database node a request to install a backup agent.

In the event the user registered all of the database nodes associated with a database, the secondary storage system may send a request to install a corresponding backup agent to the registered database nodes.

In the event the user registered one of the database nodes associated with a database, the secondary storage system may send a request to install a backup agent to the registered database node. For example, the secondary storage system may send the request to a database node associated with a SCAN name or VIP address and the backup agent may be installed on the database node associated with the SCAN name or VIP address.

At 306, properties of one or more databases of nodes of a database system are automatically discovered.

In some embodiments, a registered database node is associated with a SCAN name and the backup agent sends a processor of the registered database node on which the backup agent is installed a request for a list of the one or more other database nodes associated with the SCAN name. In response to the request, the processor of the registered database node on which the backup agent is installed may provide an identifier (e.g., IP address) associated with the one or more other database nodes associated with the SCAN name or VIP address. The secondary storage system may send a request to install a corresponding backup agent to each of the other database nodes associated with the SCAN name or VIP address and the corresponding backup agents may be installed on the one or more other database nodes associated with the SCAN name or VIP address. Each of the backup agents installed on a database node associated with the SCAN name or VIP address may send to a corresponding processor of the corresponding database node a request for a list of the one or more databases running on the corresponding database node. The list of one or more databases may include one or more stand-alone databases and/or one or more database nodes that are part of one or more database clusters.

In other embodiments, a user associated with a primary system registers all of the database nodes associated with the primary system and the corresponding backup agents send a processor of the registered database node on which the corresponding backup agents are installed a request for a list of the one or more databases running on the registered database node. In response to the request, each processor of the registered database node may provide to a corresponding backup agent the list of the one or more databases running on the registered database node.

The one or more installed backup agents may provide to a secondary storage system corresponding lists and corresponding role information associated with the one or more database nodes of the primary system. In response to receiving the corresponding lists and corresponding role information, the secondary storage system may compile the list and role information, and determine an overall configuration of the primary system. The secondary storage system may store a data structure that organizes the configuration information of the primary system. The overall configuration of the primary may include the database nodes that are included in the primary system, a database architecture associated with a database (e.g., stand-alone or part of a database cluster), and/or a failover role.

At 308, a command to perform a backup snapshot is provided to at least one of the backup agents. For each of the one or more databases, a corresponding one of the nodes is selected as a corresponding backup source node based at least in part on the discovered properties.

For example, for a multiple stand-alone database that is comprised of a database service where the database service is active on one of the database nodes and passive on the other database nodes, a database node hosting an active database service may be selected as a backup source node. In other embodiments, for a multiple stand-alone database that is comprised of multiple instances of a stand-alone database where one instance of the stand-alone database has a primary role on one of the database nodes and one or more other instances of the stand-alone database have a standby role on one or more other database nodes, a database node hosting the stand-alone database that has a standby role may be selected as a backup source node.

For a database cluster, any of database nodes hosting the active database instances may be selected and used to perform a backup. For a single stand-alone database, the database node on which the single stand-alone database is hosted is selected and used to perform a backup.

The one or more databases running on a primary system (e.g., database system) may be backed up according to a backup snapshot policy. The backup policy may indicate when one of the one or more databases is to be backed up. A secondary storage system may inspect the data structure to determine which database instance and which database node hosting the database instance is to be used to back up a database, i.e., perform a backup snapshot. This ensures that a correct database node of the primary system is used to perform a backup snapshot without hindering database performance. The secondary storage system may send to the backup agent installed on the determined node a command to backup a database. In response to receiving the command, the backup agent may cause the database node on which the backup agent is installed to perform a backup snapshot.

Figure 4:
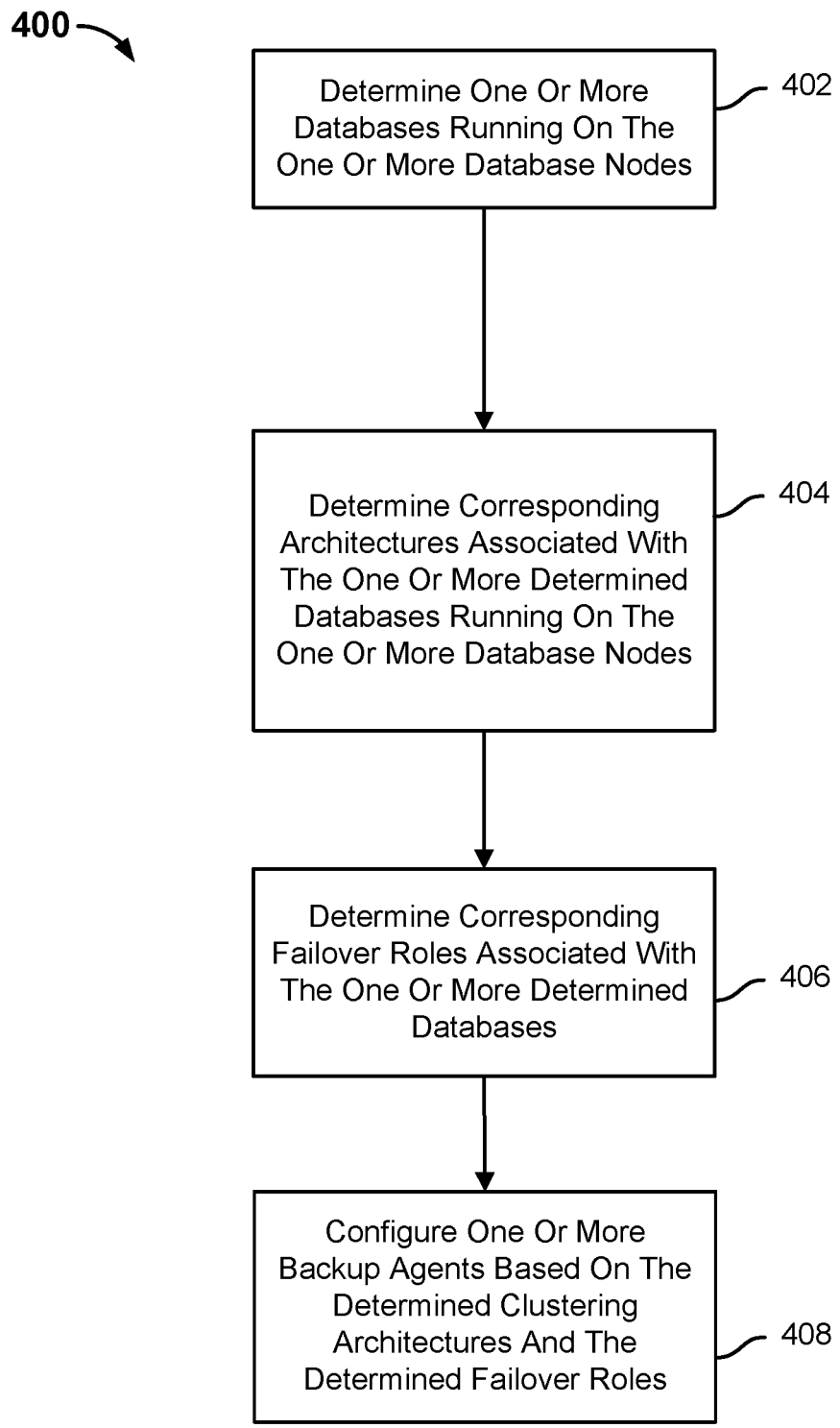
FIG. 4 is a flow chart illustrating an embodiment of a process for configuring a backup agent.

FIG. 4 is a flow chart illustrating an embodiment of a process for configuring a backup agent. In the example shown, process 400 may be implemented by a storage system, such as secondary storage system 112. In some embodiments, process 400 may be implemented to perform all or a portion of step 306 of process 300.

At 402, one or more databases running on one or more database nodes are determined. A primary system may be comprised of one or more database nodes. Each database node may be running one or more databases. The one or more databases running on each of the database nodes of the primary system may be determined.

In some embodiments, the user associated with a primary system registers all of the database nodes associated with a database. The secondary storage system may send a request to install a corresponding backup agent to the registered database nodes. The corresponding backup agent may be installed on the one or more database nodes. A backup agent may send to a processor of the database node on which the backup agent is installed a request for a list of one or more databases running on the database node. The list may include one or more stand-alone databases. In response to receiving the list of one or more databases running on the database node, the backup agent may provide the list to a secondary storage system. The list may include corresponding role information associated with the one or more databases running on the database node.

In other embodiments, the user associated with a primary system registers one of the database nodes associated with a database. For example, the user may provide a SCAN name or a VIP address associated with a database. The secondary storage system may send a request to install a backup agent to the database node associated with the SCAN name or VIP address. The backup agent may be installed on the database node associated with the SCAN name or the database node associated with the VIP address. The backup agent may send a processor of the database node on which the backup agent is installed a first request for a list of the one or more other database nodes associated with the SCAN name or the VIP address. In response to the request, the processor of the database node on which the backup agent is installed may provide an identifier (e.g., IP address) associated with the one or more other database nodes associated with the SCAN name or VIP address. The secondary storage system may send a request to install a corresponding backup agent to each of the other database nodes associated with the SCAN name or VIP address, and the corresponding backup agents may be installed on the one or more other database nodes associated with the SCAN name or VIP address.

In addition to database associated with the SCAN name or VIP address, a database node may be running one or more other databases. A backup agent may discover the one or more other databases running on the database node on which the backup agent is installed. In some embodiments, the backup agent sends to a processor of the database node on which the backup agent is installed a second request for a list of the one or more databases running on the database node. The list of one or more databases may include one or more stand-alone databases and/or one or more database nodes that are part of one or more database clusters. The list may also include corresponding role information associated with the one or more databases running on a database node.

At 404, corresponding architectures associated with the one or more determined databases running on the one or more database nodes are determined. A secondary storage system may receive a plurality of lists from a plurality of backup agents associated with a primary system. The secondary storage system may determine whether an architecture associated with a database is a stand-alone database or the database is part of a database cluster architecture. In the event a database is listed on only one of the plurality of lists, the database architecture is determined to be a single stand-alone database. In the event a database appears on more than one of the plurality of lists and is associated with a SCAN name, the database architecture may be determined to be a database cluster architecture and the database instance is determined to be part of a database cluster. In the event a database appears on more than one of the plurality of lists and is associated with a VIP address, the database architecture may be determined to be a multiple stand-alone database and the database service is determined to be part of the multiple stand-alone database.

At 406, corresponding roles associated with the one or more determined databases are determined. The plurality of lists received from the plurality of backup agents associated with a primary system may include role information associated with a database. For example, a database may have an active role, a standby role, or a passive role. The secondary storage system may determine a role associated with an instance of a database based on the role information included in the plurality of lists.

At 408, one or more backup agents are configured based on the determined architectures and the determined roles. The secondary storage system may compile the database configuration information based on the plurality of received lists. The secondary storage system may determine an overall configuration of the primary system. The secondary storage system may generate and store a data structure that lists the one or more databases running on a database node and their corresponding roles.

The secondary storage system may use the overall primary system configuration to configure the one or more backup agents installed on the primary system. For example, a database node may be running a stand-alone database and an instance of a database that is part of a database cluster. A first set of one or more backup commands may be used to cause a backup of the stand-alone database and a second set of one or more backup commands may be used to cause a backup of the instance of the database that is part of the database cluster. The backup agent may be configured such that it will use the first set of one or more backup commands to cause a backup of the stand-alone database and the second set of one or more backup commands to cause a backup of the instance of the database that is part of the database cluster.

For a multiple stand-alone database architecture, the database node that is to be used to perform the backup snapshot may depend on a failover role associated with the stand-alone database hosted on the database node. For example, a database node that hosts an active database service may be used to perform a backup snapshot instead of a database node that hosts a passive database service. The backup agent installed on the database node that hosts the active database service may be configured to cause a backup of the database service.

For a multiple stand-alone database architecture, a stand-alone database that has a standby role may be used to perform a backup snapshot instead of a stand-alone database that has a primary role. The backup agent installed on the database node that hosts the stand-alone database that has a standby role may be configured to cause a backup of the database. The state of a stand-alone database that has an active role may be inconsistent with the state of a stand-alone database that has a standby role. An archive log associated with the stand-alone database that has an active role may be flushed to the stand-alone database that has a passive role before the database node hosting the stand-alone database that has a passive role is used to perform a backup snapshot.

Configuring the correct backup agent to perform the backup snapshot may ensure that a correct database node of the primary system is used to perform a backup snapshot without hindering database performance.

Figure 5:
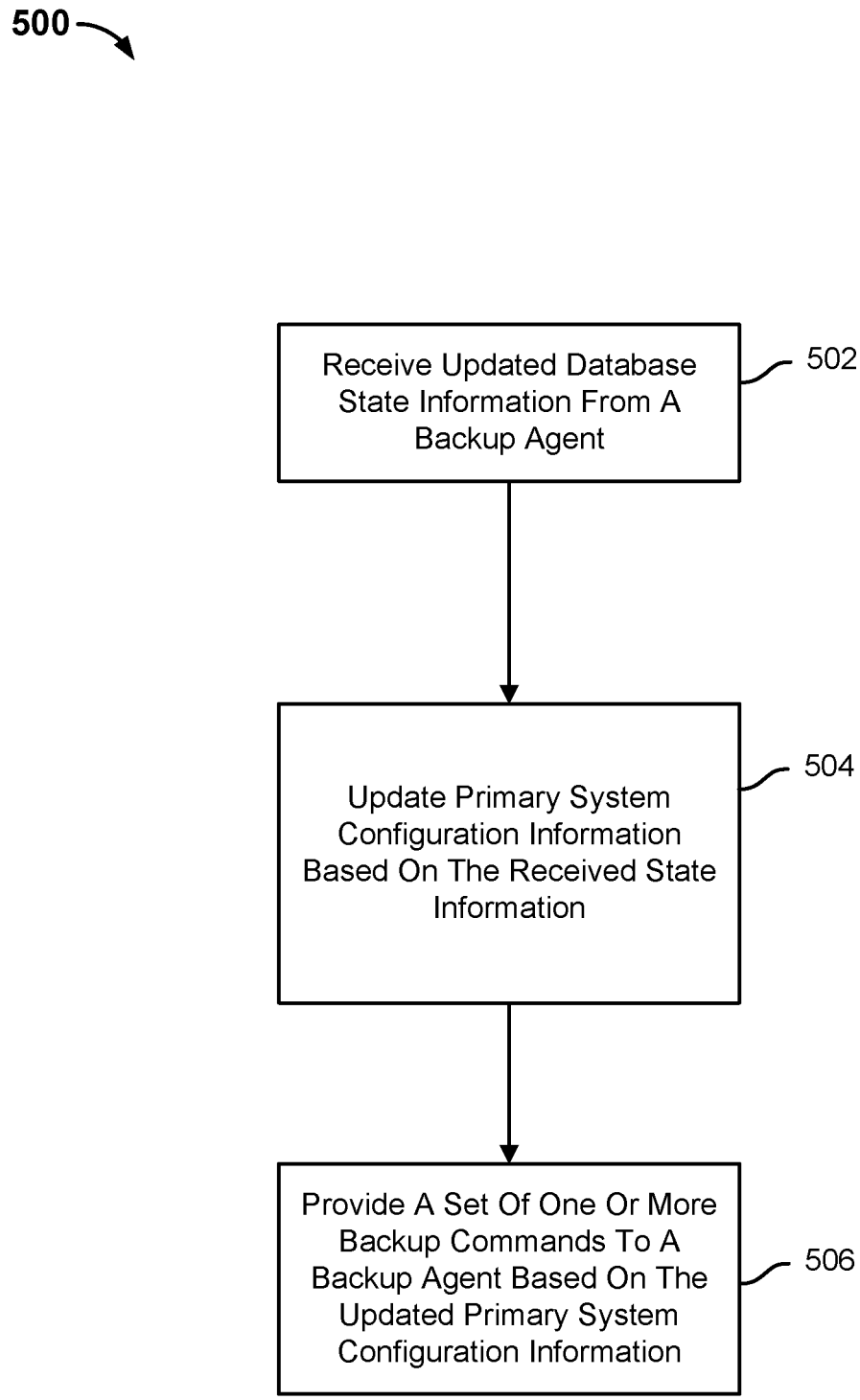
FIG. 5 is a flow chart illustrating an embodiment of a process for backing up a database.

FIG. 5 is a flow chart illustrating an embodiment of a process for backing up a database. In the example shown, process 500 may be implemented by a backup system, such as secondary storage system 112.

At 502, updated database role information is received from a backup agent. In some embodiments, the secondary storage system periodically receives from the backup agent updated database role information. In other embodiments, the secondary storage system receives from the backup agent updated database role information when a role of the database changes. For example, the updated database role information may indicate that for a multiple stand-alone database, a database node hosting an active database service may go offline, which may cause a passive database service to become active and act as a failover.

At 504, primary system configuration information is updated based on the received role information. In response to receiving the updated database role information, the secondary storage system may update the data structure that organizes the configuration information of the primary system. This ensures that the secondary storage system sends a backup command to the correct database node of the primary system. A performance associated with a database may be reduced in the event an incorrect database node hosting an instance of the database is used to perform a backup snapshot.

At 506, a set of one or more backup commands is provided to a backup agent based on the updated primary system configuration information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
automatically discovering, by a secondary storage system, properties of one or more databases running in a database system that includes a plurality of nodes, wherein the automatically discovered properties for at least one of the databases include a corresponding database architecture and a corresponding failover role for each of at least some of the nodes, wherein automatically discovering properties of one or more databases running in the database system includes receiving at the secondary storage system from each of the plurality of nodes a corresponding list that indicates one or more corresponding databases running on the corresponding database node;
based at least in part on the discovered properties, selecting, by the secondary storage system, for each of the one or more databases, a corresponding one of the nodes as a corresponding backup source node; and allowing one or more database backups to be performed via the one or more selected backup source nodes.

2. The method of claim 1, wherein automatically discovering properties of the one or more databases of the nodes of the database system includes determining whether a database of the one or more databases is a stand-alone database or a database instance that is part of a database cluster.

3. The method of claim 2, wherein one of the selected backup source nodes hosts an active database service.

4. The method of claim 2, wherein one of the selected backup source nodes hosts a stand-alone database that has a standby role.

5. The method of claim 1, wherein the corresponding failover role for the at least one of the databases is active, standby, or passive.

6. The method of claim 1, further comprising registering one or more of the nodes.

7. The method of claim 6, further comprising installing a corresponding backup agent to the one or more registered nodes.

8. The method of claim 7, wherein the corresponding backup agent is configured to send to a processor of the node on which the corresponding backup agent is installed a first request for the corresponding list of one or more databases running on the node.

9. The method of claim 8, wherein at least one of the one or more databases included in the corresponding list of one or more databases is part of a database cluster.

10. The method of claim 9, wherein the corresponding backup agent is configured to send to the processor of the node on which the corresponding backup agent is installed a second request for a list of one or more other nodes associated with the database cluster.

11. The method of claim 1, further comprising receiving from a backup agent installed on one of the nodes updated role information associated with the database.

12. The method of claim 11, further comprising updating primary system configuration information based on the updated role information.

13. The method of claim 12, wherein a set of one or more commands used to perform a database backup is based on the updated role information.

14. The method of claim 12, wherein a set of one or more commands used to perform a database backup is based on the corresponding database architecture.

15. The method of claim 1, wherein the corresponding database architecture is a database cluster and the corresponding failover role for each of at least some of the nodes is a primary database role or a standby database role.

16. A system, comprising:
  one or more processors configured to:
    automatically discover properties of one or more databases running in a database system that includes a plurality of nodes, wherein the automatically discovered properties for at least one of the databases include a corresponding database architecture and a corresponding failover role for each of at least some of the nodes, wherein automatically discover properties of one or more databases running in the database system, the one or more processors are configured to receive from each of the plurality of nodes a corresponding list that indicates one or more corresponding databases running on the corresponding database node;
    based at least in part on the discovered properties, select for each of the one or more databases, a corresponding one of the nodes as a corresponding backup source node; and
    allow one or more database backups to be performed via the one or more selected backup source nodes; and
  a memory coupled to the one or more processors and configured to provide the one or more processors with instructions.

17. The system of claim 16, wherein to automatically discover properties of the one or more databases of the nodes of the database system, the one or more processors are further configured to determine whether a database of the one or more databases is a stand-alone database or a database instance that is part of a database cluster.

18. The system of claim 17, wherein one of the selected backup source nodes hosts an active database service.

19. The system of claim 17, wherein one of the selected backup source nodes hosts a stand-alone database that has a standby role.

20. A non-transitory computer readable storage medium comprising computer instructions for:
  automatically discovering, by a secondary storage system, properties of one or more databases running in a database system that includes a plurality of nodes, wherein the automatically discovered properties for at least one of the databases include a corresponding database architecture and a corresponding failover role for each of at least some of the nodes, wherein automatically discovering properties of one or more databases running in the database system includes receiving at the secondary storage system from each of the plurality of nodes a corresponding list that indicates one or more corresponding databases running on the corresponding database node;
  based at least in part on the discovered properties, selecting, by the secondary storage system, for each of the one or more databases, a corresponding one of the nodes as a corresponding backup source node; and
  allowing one or more database backups to be performed via the one or more selected backup source nodes.

* * * * *